UNITED STATES PATENT OFFICE.

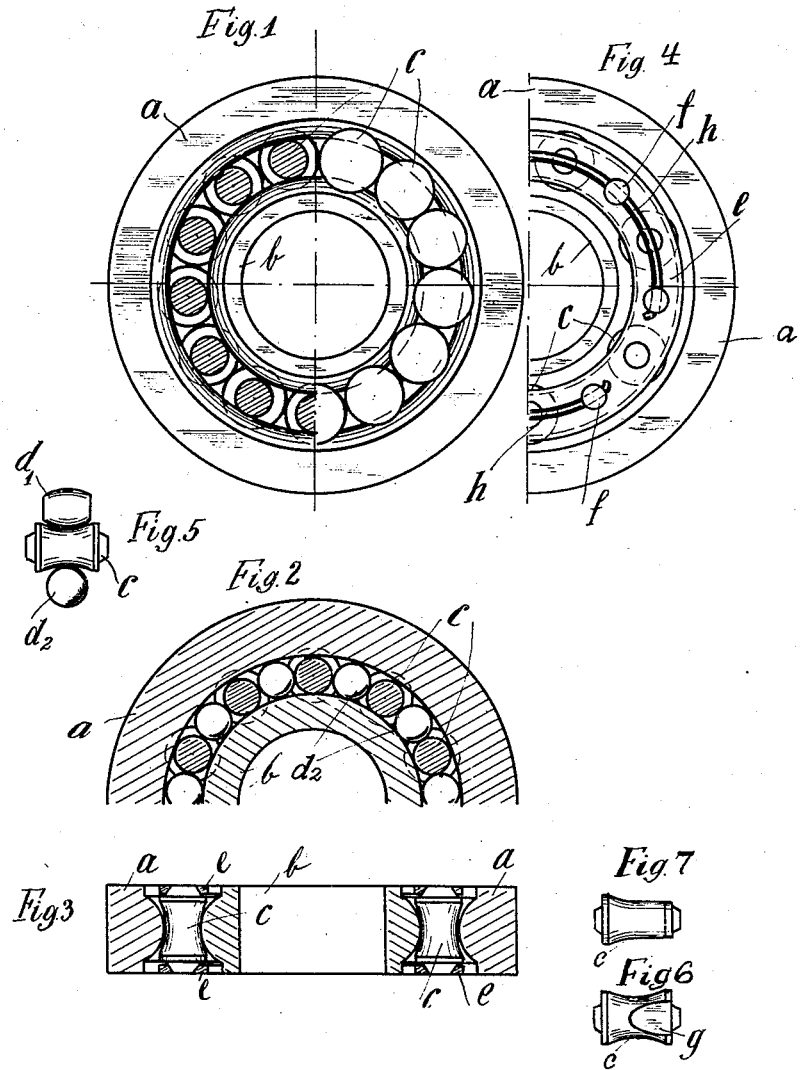

AUGUST SCHILLING, OF BERLIN, GERMANY.

ROLLER-BEARING.

No. 928,800.     Specification of Letters Patent.     Patented July 20, 1909.

Application filed October 24, 1907. Serial No. 399,027.

*To all whom it may concern:*

Be it known that I, AUGUST SCHILLING, a subject of the German Emperor, and residing at Hochstädterstrasse 21, Berlin, Germany, have invented certain new and useful Improvements in Roller-Bearings, of which the following is a specification.

This invention has for its object the improvement in bearing in which an annular projection on the bearing-rings runs against a concave curve in the bearing surface of the rollers. The radius of curvature of the axial section of the rollers is such that the rollers only come in contact with the bearing surface of the bearing-rings in a point, and not over a considerable portion of the bearing surface. The object of this is to reduce the friction to a minimum.

In order that the invention may be clearly understood reference is made to the accompanying drawing in which several embodiments are represented by way of example, and in which:

Figure 1 is an elevation of the bearing rings, the left-hand half of which represents the rollers in a vertical-section and the right-hand half shows an elevation of the rollers. Fig. 2 a transverse section of another form. Fig. 3 is a longitudinal section and Fig. 4 an elevation of a modification. Fig. 5 shows details, and Fig. 6 represents an elevation and Fig. 7 a side-view of a useful form of a roller.

Referring to the drawing, rollers $c$ are arranged between the rings $a$ and $b$. The central portion of the roller which is contacted by the rings has a smaller diameter than the remaining parts of the rollers. The diameter of the rollers increases toward both ends; the manner in which the cross-section increases is such that the longitudinal section through the axes of the rollers forms a curve, the radius of curvature of which is greater than the radius of curvature of the axial section of the running-surface of the outer ring $a$ and of the race of the inner ring $b$.

The number of rollers in the bearing may be optional. In the form shown in Fig. 1 the bearing is filled up with the complete number of rollers so that the rollers contact one another at their ends.

In the example shown in Fig. 2 distance-pieces are inserted between the rollers which are able to transmit the pressure from one roller to the other. The distance-pieces (Fig. 5) are preferably roller-shaped bodies $d^1$, or ball-like bodies $d^2$, and contact the periphery of the rollers in a point. The distance-pieces are preferably freely movable between the rollers $c$.

Fig. 3 shows a longitudinal section of a roller-bearing. The rollers $c$ are provided at the ends with conical pins engaging into holes of a cage $e$, which guides the rollers between the outer ring $a$ and the inner ring $b$. The surface of the rollers $c$ is curved concavely. At the place of the smallest diameter of the middle part of the rollers these encounter the rings $a$ and $b$. From this, the narrowest part the diameter of the rollers enlarges to both ends corresponding to a radius of a curve which is greater than the radius of the curve of the races of the rings $a$ and $b$.

In Fig. 4, I have shown a simple form of securing the stay-bolts $f$ holding together the cage $e$ into which the projecting pins of the rollers $c$ engage and which is arranged between the outer ring $a$ and the inner ring $b$. The means for securing the stay-bolts $f$ in their position consists of a ring shaped wire $h$ engaging into holes placed in the projecting ends of the stay-bolts $f$.

In order to admit as large a number of rollers $c$ being inserted in the space between the rings $a$ and $b$, it is preferable to provide one or more rollers with a flattened portion $g$, which is shown in Figs. 6 and 7.

What I claim as my invention and desire to secure by Letters Patent is:

A roller-bearing comprising running rings, which have bearing faces curved convexly in axial section, and rollers having bearing faces curved concavely in axial section, the radius of curvature of said curved roller faces being greater than the radius of curvature of said curved ring faces, and some rollers being flattened at one end, as substantially as described.

In witness whereof I have hereunto set my hand in presence of two witnesses.

AUGUST SCHILLING.

Witnesses:
    WOLDEMAR HAUPT,
    HENRY HASPER.